Patented Apr. 17, 1951

2,548,970

UNITED STATES PATENT OFFICE 2,548,970

LIQUID LIP-ROUGE COMPOSITION

Lorene Grigsby Grate, Miami, Fla.

No Drawing. Application October 22, 1948,
Serial No. 56,051

5 Claims. (Cl. 167—85)

This invention relates to liquid lip-rouge compositions.

A principal object of this invention is the provision of liquid compositions used in applying a moisture-proof, softening, healing, thin tint coating to the lips. A further object is the provision of liquid lip tinting preparations:

(1) which do not smear but rub off only under relatively high pressure;

(2) which remain on the lips for relatively long periods of time and disappear very evenly and gradually;

(3) which do not flake or peel;

(4) which impart a natural velvety appearance to the lips;

(5) which remain in perfect solution without formation of a sediment upon standing;

(6) which may be applied in a most exacting manner permitting delicate coloring of the lips so that two shades can be obtained from a single colored composition;

(7) which do not run and permit an even, sharp outline to be maintained.

Still further objects will become apparent from the detailed description given hereinafter.

These objects are accomplished according to the present invention by the formation of lip-rouge compositions containing cetyl alcohol, gum benzoin, lecithin, dye and perfume dissolved in a major proportion of a volatile solvent. In addition to these basic ingredients, other materials may be included, such as plasticizers or wetting agents.

It has been discovered that compositions containing the basic ingredients specified above, form liquid preparations which, when applied to the lips, form a thin, even coat which does not readily rub off and which gives the lips a natural appearance. Consequently, these new compositions differ from the related materials known heretofore, because the prior art products have been found to invariably form relatively heavy lip coatings which quite readily rub off, peel or flake and leave the lips with an uneven color in a very short period of time. In addition, the new products of this invention do not form sediments upon standing for relatively long periods of time, in contrast to the majority of similar compositions employed heretofore.

A major proportion of my new lip rouge compositions is the solvent. This should preferably be a lower alkyl alcohol, such as ethyl alcohol or isopropyl alcohol, but comparable solvents, such as one part of witch hazel mixed with six parts of ethyl alcohol may be employed. The solvent should be used in an amount equal to 50 to 90 per cent by weight of the total composition.

A second important ingredient of my products is cetyl alcohol. This is preferably incorporated into the compositions as a saturated solution in ethyl or isopropyl alcohol. It has been found to be obstinately retained by the skin and to provide the lip rouge with the ability to impart a velvety appearance when applied to the lips. It is preferably used in my products in proportions of 1 to 25 per cent by weight.

The lecithin which is employed as an essential component of my products can be derived from any desirable source. Thus, for example, lecithin which is obtained from soybeans, corn, egg yolk, or animal sources, may be used. It should be used in proportions of about 1 to 25 per cent by weight.

As indicated above, gum benzoin is an important ingredient in the new compositions. The material itself may be used in the formation of the composition, but preferably, it is incorporated as a saturated tincture or it may be incorporated as the tincture of benzoin and rosin. This component of my new products has been found to have an antiseptic and healing effect upon the mucous membranes of the mouth and to maintain the lips in unblemished condition, thus co-operating with the other components of the lip rouge to maintain a natural and even appearance over a long period of time. It should be used in proportions of about 3 to 40 per cent by weight of the total composition.

In order to provide the composition with color, alcohol-soluble dyes of any desired shade are used in proportions of about 0.05 to 3 per cent by weight. Furthermore, the attractiveness of the compositions is enhanced by incorporation of perfume of any desired variety in proportions of about 0.03 to 2 per cent by weight.

In addition to the ingredients discussed above, other materials may be incorporated. For example, plasticizers may be added or wetting agents may be used in order to insure smoother application of the products. Sulfonated castor oil has been found to be a useful component since it acts both as a plasticizer and as a wetting agent. Examples of other suitable wetting agents which may be used include: aryl sulfonates and their alkali metal salts and fatty alcohol sulfates, such as lauryl sulfate or the alkali metal salts thereof, e. g., the commercial product sold under the trade name "Duponol."

The above discussion of essential ingredients of my new lip rouge composition gives the broad limits on concentrations of the ingredients. More specific and preferred concentrations of ingredients are given by the following tables, in which all percentages are by weight.

Table I

| | Per cent |
|---|---|
| Solvent | 60 to 90 |
| Gum benzoin | 1 to 25 |
| Cetyl alcohol | 1 to 20 |
| Lecithin | 1 to 20 |
| Wetting agent | 1 to 20 |
| Dye | 0.05 to 3 |
| Perfume | 0.03 to 2 |

Table II

| | Per cent |
|---|---|
| Isopropyl alcohol | 60 to 90 |
| Gum benzoin | 1 to 12 |
| Cetyl alcohol | 1 to 12 |
| Sulfonated castor oil | 1 to 12 |
| Lecithin | 3 to 20 |
| Dye | 0.05 to 3 |
| Perfume | 0.03 to 2 |

Table III

| | Per cent |
|---|---|
| Isopropyl alcohol | 60 to 90 |
| Gum benzoin | 3 to 25 |
| Cetyl alcohol | 1 to 12 |
| Lecithin | 3 to 20 |
| Fatty alcohol sulfate | 3 to 20 |
| Dye | 0.05 to 3 |
| Perfume | 0.03 to 2 |

Table IV

| | Per cent |
|---|---|
| Isopropyl alcohol | 60 to 90 |
| Lecithin | 1 to 25 |
| Saturated tincture of gum benzoin and rosin | 5 to 25 |
| Cetyl alcohol | 1 to 12 |
| Dye | 0.05 to 3 |
| Perfume | 0.03 to 2 |

A further understanding of the products of this invention may be had by reference to the following example of an actual composition prepared in accordance with the present invention.

Example

A lip rouge is prepared from the following ingredients:

| | Parts by weight |
|---|---|
| Isopropyl alcohol | 70 |
| Soybean lecithin | 5 |
| Cetyl alcohol | 1 |
| Tincture of benzoin (U. S. P.) | 5 |
| Dye | 0.5 |
| Perfume | 0.4 |

The composition is prepared by first dissolving the dye in the isopropyl alcohol heated to slightly below the boiling point. The dye solvent solution is then allowed to cool to room temperature and the remaining ingredients are dissolved in the mixture in the following order: soybean, tincture of benzoin, cetyl alcohol and perfume.

A vividly colored liquid composition results which can be easily poured into suitable application containers, such as a small screw top bottle containing a top mounted brush or the like.

The products provided by the present invention permit the lips to be easily colored or tinted with a uniform coating having a velvety appearance. Such a delicate coloring layer can be applied with these compositions that several separate applications may be used so that a deeper shade may be obtained in one area than in another.

I claim:

1. A liquid lip-rouge composition comprising the following ingredients:

| | Per cent by weight |
|---|---|
| Solvent | 50 to 90 |
| Gum benzoin | 3 to 40 |
| Cetyl alcohol | 1 to 25 |
| Lecithin | 1 to 25 |
| Dye | 0.05 to 3 |
| Perfume | 0.03 to 2 |

2. A liquid lip-rouge composition consisting essentially of the following ingredients:

| | Per cent by weight |
|---|---|
| Solvent | 60 to 90 |
| Gum benzoin | 1 to 25 |
| Cetyl alcohol | 1 to 20 |
| Lecithin | 1 to 20 |
| Wetting agent | 1 to 20 |
| Dye | 0.05 to 3 |
| Perfume | 0.03 to 2 |

3. A liquid lip-rouge composition consisting essentially of the following ingredients:

| | Per cent by weight |
|---|---|
| Isopropyl alcohol | 60 to 90 |
| Gum benzoin | 1 to 12 |
| Cetyl alcohol | 1 to 12 |
| Sulfonated castor oil | 1 to 12 |
| Lecithin | 3 to 20 |
| Dye | 0.05 to 3 |
| Perfume | 0.03 to 2 |

4. A liquid lip-rouge composition consisting essentially of the following ingredients:

| | Per cent by weight |
|---|---|
| Isopropyl alcohol | 60 to 90 |
| Gum benzoin | 3 to 25 |
| Cetyl alcohol | 1 to 12 |
| Lecithin | 3 to 20 |
| Fatty alcohol sulfate | 3 to 20 |
| Dye | 0.05 to 3 |
| Perfume | 0.03 to 2 |

5. A liquid lip-rouge composition consisting essentially of the following ingredients:

| | Per cent by weight |
|---|---|
| Isopropyl alcohol | 60 to 90 |
| Lecithin | 1 to 25 |
| Saturated tincture of gum benzoin and rosin | 5 to 25 |
| Cetyl alcohol | 1 to 12 |
| Dye | 0.05 to 3 |
| Perfume | 0.03 to 2 |

LORENE GRIGSBY GRATE.

REFERENCES CITED

The following references are of record in the file of this patent:

UNITED STATES PATENTS

| Number | Name | Date |
|---|---|---|
| 2,230,063 | Klimist | Jan. 28, 1941 |

OTHER REFERENCES

Chemist and Druggist, August 23, 1941, page 103.

Goodman, Cosmetic Dermatology (1936) pages 138, 139, 155, 399.

Thomssen, Modern Cosmetics (1947), page 299.